United States Patent [19]

Yamanaka et al.

[11] Patent Number: 4,726,105

[45] Date of Patent: Feb. 23, 1988

[54] METHOD FOR PRODUCING A METALLIC SUBSTRATE USED FOR AUTOMOBILE EXHAUST GAS PURIFYING DEVICE

[75] Inventors: Mikio Yamanaka; Keiichi Omura; Masayuki Tendo, all of Sagamihara, Japan

[73] Assignee: Nippon Steel Corporation, Tokyo, Japan

[21] Appl. No.: 13,444

[22] Filed: Feb. 10, 1987

[30] Foreign Application Priority Data

Feb. 10, 1986 [JP] Japan .................................. 61-27243

[51] Int. Cl.$^4$ .............................................. B21D 53/00
[52] U.S. Cl. ................................. 29/157 R; 29/527.1; 29/530; 29/557; 29/DIG. 16; 422/177
[58] Field of Search ............... 29/157 R, 419 R, 527.1, 29/530, 557, 558, DIG. 16, DIG.24, DIG. 31; 422/177, 180, 181

[56] References Cited

U.S. PATENT DOCUMENTS

| | | | |
|---|---|---|---|
| 4,098,722 | 7/1978 | Carns et al. | 29/157 R X |
| 4,186,172 | 2/1980 | Scholz | 29/157 R X |
| 4,318,888 | 3/1982 | Chapman et al. | 29/157 R X |
| 4,381,590 | 5/1983 | Nonnenmann et al. | 29/157 R |
| 4,416,676 | 11/1983 | Montierth | 422/180 X |
| 4,417,908 | 11/1983 | Pitcher, Jr. | 422/180 X |
| 4,521,947 | 6/1985 | Nonnenmann et al. | 29/157 R |

FOREIGN PATENT DOCUMENTS 56-96726  8/1981  Japan .
57-71896  5/1982  Japan .

*Primary Examiner*—Howard N. Goldberg
*Assistant Examiner*—Ronald S. Wallace
*Attorney, Agent, or Firm*—Wenderoth, Lind & Ponack

[57] ABSTRACT

A method for producing a metallic substrate used for an automobile exhaust gas purifying device, which comprises the steps of: preparing a heat-resisting steel member having a length and capable of containing therein other members; densely filling the heat-resisting steel member with easy-soluble material members and with stainless steel members for separating the easy-soluble material members from each other, to form a filled body; hot-working the filled body to reduce the cross sectional area thereof for achieving a metallic bond between the stainless steel members; cutting the filled body to a predetermined length; and removing the easy-soluble material from the filled body by a chemical and/or an electrochemical treatment for boring throughholes to expose catalyst carrier-destined surfaces of the stainless steel.

11 Claims, 6 Drawing Figures

Fig. 1(a)
Fig. 1(b)
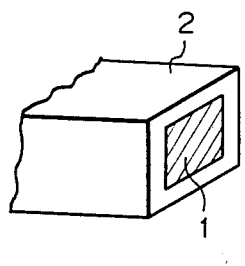
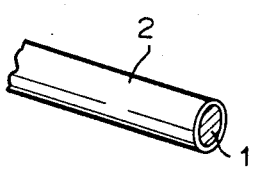
Fig. 1(c)
Fig. 1(d)
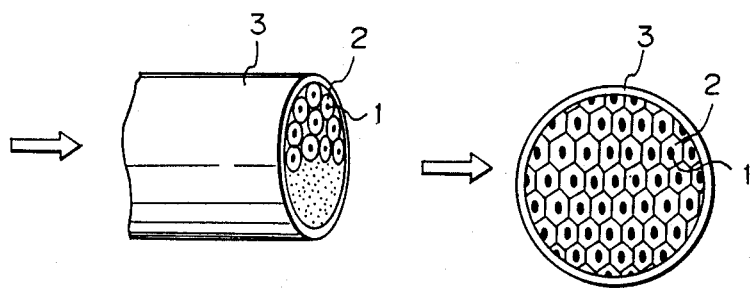
Fig. 1(e)
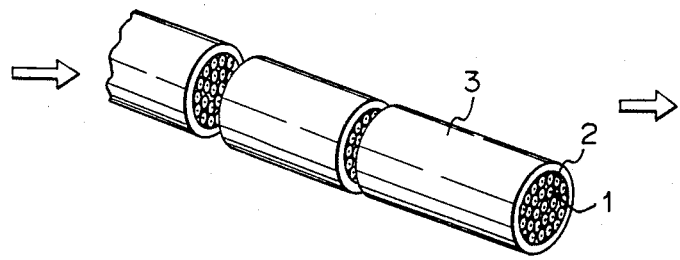

METHOD FOR PRODUCING A METALLIC SUBSTRATE USED FOR AUTOMOBILE EXHAUST GAS PURIFYING DEVICE

TECHNICAL FIELD

The present invention relates to a method for producing a metallic substrate used for an automobile exhaust gas purifying device.

BACKGROUND ART

Recently, particularly from about 1970, emission control for automobiles has been seriously considered. Accordingly, a law regulating automobile exhaust gas emission was promulgated to the effect that the passenger automobiles must be equipped with a device for purifying the exhaust gas. Several systems were proposed for devices for purifying the exhaust gas, but the most widely used at present is a catalyst converter system, whereby HC and CO are oxidized and, simultaneously, NOx is reduced. The structure of these catalyst converters is such that a carrier, which is a honeycomb sintered body of ceramic mainly composed of corderite, is mounted in a metallic cylinder, as a metallic substrate, and porous $\gamma$-$Al_2O_3$ powder, which is impregnated with a noble metal (Pt~Pd) catalyst, is deposited on the carrier. The honeycomb ceramic has, however, disadvantages in that it is not highly resistant to mechanical impact, some exhaust gas is able to leak through the clearance between the honeycomb and the outer sleeve, and in addition, the exhaust resistance is rather high. To cope with these disadvantages, Japanese Unexamined patent publication No. 57-71898 disclosed a several tens of microns thick foil rolled from high Al ferritic stainless steel laminated with a corrugated sheet which is produced by forming the foil, or coiled in the form of a honeycomb, thereby enabling it to be used as the carrier instead of the ceramic honeycomb mentioned above. Japanese Unexamined patent publication No. 56-96726 also disclosed how to produce a foil used for the metal honeycomb by peeling a high Al ferritic stainless steel bar. Since a high degree of working strain during the peeling is introduced into the stainless steel foil produced by this method, when the foil is heated to a high temperature in an oxidizing atmosphere, the diffusion of Al from the interior to the surface of the foil is promoted, which results in the formation of $Al_2O_3$ in the form of whiskers, which enhances a rigid bonding of $\gamma$-$Al_2O_3$ powder, i.e., the direct carrier of a noble metal-catalyst, on the honeycomb. Nevertheless, these techniques have several disadvantages, in that, in the former method, in a cold-rolling process to obtain an approximately 40 to 50 $\mu$m thick foil of high Al stainless steel, the annealing and pickling steps must be repeated several times because of the poor workability of the high Al stainless steel, and after assembly as a honeycomb, the foils must be fixed together by brazing as well as to an outer sleeve by a complicated process, which leads to an increase of costs.

Also for the peeling technique, it is difficult to stably obtain a foil having a uniform thickness and width.

Therefore, it has been desired to develop a simpler means in the method for producing a metallic substrate used for an automobile exhaust gas purifying device.

OBJECT OF THE INVENTION

The object of the present invention is to provide a method for producing a metallic substrate used for an automobile exhaust gas purifying device. The method according to the present invention has been realized through extensive study, to satisfy the aforementioned need, and is much simpler than the aforementioned conventional methods.

DISCLOSURE OF THE INVENTION

The object is achieved by the method for producing a metallic substrate used for an automobile exhaust gas purifying device according to the present invention, the metallic substrate having a length necessary for said use and substantially consisting of a honeycomb and an outer sleeve, both of which extend along the entire length of the metallic substrate, wherein said method comprises the steps of:

preparing a heat-resisting steel member having a length and capable of containing therein the following easy-soluble material members and stainless steel members extending along the entire length thereof;

densely filling the heat-resisting steel member with easy-soluble material members extending along the entire length of the heat-resisting steel member and with stainless steel members for separating the easy-soluble material members from each other over the entire length thereof, to form a filled body;

hot-working the filled body to reduce the cross sectional area thereof at a reduction ratio necessary for achieving a metallic bond between the stainless steel members;

cutting the filled body to a predetermined length sufficient for the metallic substrate; and removing the easy-soluble material from the filled body by at least one of a chemical and an electrochemical treatment for boring throughholes extending along the entire length of the filled body to expose catalyst carrier-destined surfaces of the stainless steel.

The easy-soluble material may be in the form of a wire, a bar, or a powder.

The stainless steel for covering or separating the easy-soluble material may be in the form of a seamless pipe, a welded pipe, a pipe formed from strip, a wound foil, or a laminated structure of corrugated and flat sheets.

The stainless steel for covering or separating the easy-soluble material may be in the form of a powder when the easy-soluble material is in the form of a wire or a bar.

The hot-working may be hot-extrusion, hot-forging, or hot-rolling.

Preferably, members of the easy-soluble material are covered by the stainless steel members beforehand, closely bundled, and then inserted densely into the heat-resisting steel member.

DETAILED DESCRIPTION OF THE INVENTION

The term "stainless steel" as used herein implies those steels which have a resistance to oxidation due to the high temperature exhaust gas from an automobile engine, when used to compose a final honeycomb structure, may be any of ferritic, martensitic, austenitic, dual-phase stainless steels, particularly have a high level of resistance to oxidation caused by an exhaust gas from an automobile engine, and preferably can be subjected to the hot-working adopted in the present invention, and therefore, preferably have a composition in weight percentage of 0.5% or less C, 4% or less Si, 1.0% or less Mn, 0 to 60% Ni, 11 to 30% Cr, 0 to 6% Al, 0 to 10% total of Mo, W, and Co, 0 to 3% total of Ti, Nb, Zr, and Hf, 0 to 0.2% total of Y and REM, 0 to 0.01% total of Mg and Ca, a small amount of Cu and B in accordance with need, and the remainder consisting of Fe and unavoidable impurities.

The term "easy-soluble material" as used herein implies those materials which can secure spaces corresponding to the hole portions of a honeycomb structure and are removed by a chemical and/or electrochemical treatment. The material is therefore more soluble than the aforementioned stainless steel and preferably has a good hot-workability. If these conditions can be satisfied, the material may be any of low carbon to high carbon steels, low alloy steels, high Mn steels, and high Ni steels, etc. The form of the material may be selected from a wire, a bar, and a powder in accordance with need. Further, if the above-mentioned conditions can be satisfied according to the present invention, $Al_2O_3$, MgO, $SiO_2$, CaO, $CaCO_3$, and other compound powders may be utilized alone or in the form of a mixture with easy-soluble metal powders.

The heat-resisting steel member is in the form of a hollow body, such as a pipe or a channel, having a closed cross sectional shape which may be, but is not limited to, a circle, an oval, a square, a rectangle, other polygons, or the like.

The heat-resisting steel member is to be finally an outer sleeve enclosing catalyst carriers and is preferably made of a heat-resisting steel containing 9% or more Cr, since it must have at least a minimum heat resistance as an outer sleeve and a resistance to dissolution during chemical and/or electrochemical treatment.

Next, the filling step according to the present invention may be performed in any of the following two manners. In one, easy-soluble material members are covered by stainless steel members beforehand and then inserted densely into a heat-resisting steel member, and in the other, easy-soluble material members and stainless steel members are inserted respectively into a heat-resisting steel member while being arranged in such a way that the easy-soluble material members are covered or separated by the stainless steel members.

In any of these two cases, the diameter of the easy-soluble material portions and the thickness of the stainless steel portions covering or separating the former portions are determined by the size and the shape of the purifying device to be produced and the reduction ratio during the subsequent hot-working step. The diameter of the easy-soluble material portions is usually 1 to 8 mm. The thickness of the stainless steel portions may be determined based on this diameter and considering the reduction ratio so that the hot-worked final thickness of this portion is of an order of 30 to 90 $\mu$m.

The easy-soluble material which is covered by the stainless steel beforehand can be obtained in any of the following manners: the surface of a billet of easy-soluble steel is covered by a sheet or a pipe of stainless steel or by an overlay of stainless steel weld and then the thus covered billet is subjected to hot-rolling, sometimes accompanied by cold-rolling, to obtain a wire of a predetermined diameter; the wire or powder of easy-soluble material is inserted into a pipe of stainless steel; a foil of stainless steel is wound around an easy-soluble material; etc. It is not necessary for a metallic bond to be present between the easy-soluble material portion and the stainless steel portion. Inversely, it is possible to insert beforehand various kinds of oxides or different metals between the two portions in order to prevent a mutual diffusion therebetween during subsequent steps. and thereby to ensure an easy dissolution of the easy-soluble material during chemical and/or electrochemical treatment. Further, it is also possible to insert simultaneously a foil or powder of different metals or alloys for strengthening the mutual bond of stainless steel portions and/or enriching those metals which further increase the heat resistance of the stainless steel portion.

Next, to compose a honeycomb structure, the easy-soluble material members which have been covered by the stainless steel members beforehand are inserted densely into a heat-resisting member, a pipe or a channel, appropriate as a material for an outer sleeve of the catalytic converter. The number of the easy-soluble material members to be inserted corresponds to a necessary number of holes of a final honeycomb. Another way to obtain a honeycomb structure is such that the easy-soluble material members and the stainless steel members, the latter being used to compose a honeycomb, are inserted respectively into and arranged in a heat-resisting steel pipe or channel so that the former members are covered or separated by the latter members.

In the above-mentioned manner, a starting material for hot-working is formed, upon which it is preferred after the insertion to close the both ends of the pipe or channel by an overlay welding with stainless or plain carbon steel, a welding of steel sheet, or other means in order to prevent the inserted material from being largely pushed out during the following hot-working step.

When the stainless steel in the form of a powder is used, it is preferably present at a packing ratio in volume percentage of not less than about 70%.

Next, hot-working the pipe or channel to reduce the sectional area thereof to a value of ¼ or less thereof results in a mutual bond between the stainless steel portions. The above-mentioned sectional reduction ratio of 4 is necessary to obtain a metallic bond between the stainless steel portions. As a means for the hot-working, hot-extrusion, hot-forging, or hot-rolling is convenient and will give a satisfactory result.

Next, the thus hot-worked pipe or channel is cut to a length necessary for a metallic substrate used for a catalytic converter, e.g., 50 to 200 mm. Then the dissolution to remove the easy-soluble material portions by chemical and/or electrochemical treatment leaves a honeycomb form of stainless steel and an outer sleeve of heat-resisting steel wrapping the former.

The term "chemical and/or electrochemical treatment" as used herein implies those treatments in which the dissolution rate is preferably greatly different for the stainless steel composing a honeycomb from that for the easy-soluble material used as a core, i.e., a treatment that facilitates a selective or preferential dissolution by an acid solution with or without additives or further by an application of a voltage across the metallic substrate and the solution.

BEST MODE FOR CARRYING OUT THE INVENTION

Figure 1F:
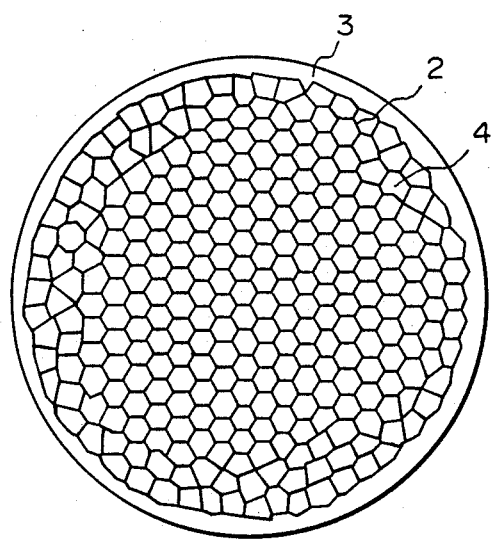
FIGS. 1(a) to 1(e) show schematically an embodiment of the production steps of the method for producing a metallic substrate used for the exhaust gas purifying device according to the present invention.
FIG. 1 (f) shows a honeycomb form filling a sleeve.

FIG. 1(a) shows a square billet for wire rolling, which is a starting material for a catalyst carrier and composed of an easy-soluble steel core 1 and a stainless steel portion 2 covering the core 1 by an arbitrary means. Then the billet is subjected to wire rolling and wire drawing to reduce the diameter thereof to obtain a wire such as shown in FIG. 1(b). After this, a number of the wires are filled in a heat-resisting steel pipe 3, which is to be an outer sleeve, to form a billet for hot-extrusion as shown in FIG. 1(c). Further reducing the diameter of the billet by hot-extrusion results in a honeycomb form of the filled members of easy-soluble material covered or separated by stainless steel as shown in FIG. 1(d). Then the thus hot-extruded honeycomb is cut to a predetermined length for a metallic substrate used for a catalytic converter as shown in FIG. 1(e). After the cutting, the honeycomb is subjected to, e.g., a pickling with nitric acid, which removes the easy-soluble material core to leave a honeycomb form of stainless steel 2 having holes 4 and filling a sleeve of a heat-resisting steel pipe 3 as shown in FIG. 1(f).

A metallic substrate used for purifying devices is obtained as mentioned above. The stainless steel honeycomb 2 functions as a catalyst carrier. For example, a slurry form of $\gamma$-$Al_2O_3$ impregnated with a noble metal catalyst is pored into the holes 4 of the honeycomb. After baking and drying, the honeycomb as a metallic substrate is attached to a not shown manifold, exhaust pipe, etc. and can be immediately provided in an automobile as an exhaust gas purifying device.

Thus, the present invention enables to obtain, without brazing, a metallic substrate used for purifying devices as a monolithic body consisting of a honeycomb form catalyst carrier of stainless steel and an outer sleeve of heat-resisting steel, and thereby to mass-produce the automobile exhaust gas purifying device more simply in comparison with the conventional method.

EXAMPLE 1

A 1.0 mm thick and 96 mm wide strip of 20% Cr-5% Al ferritic stainless steel was formed into an electric weld pipe having an outer diameter of 30.1 mm on a continuous manufacturing line. The inside of the pipe was filled with a mixture of iron powder and $Al_2O_3$ powder at a ratio of 7:1 and then cold-rolled to a wire having a diameter of 4 mm. The wire was cut to a length of 570 mm to obtain a stainless wire having a core portion filled with the powder.

2305 of the thus obtained wires were inserted densely into a 15% Cr-4% Al stainless steel pipe having a wall thickness of 3 mm, a diameter of 210 mm, and a length of 575 mm. Both ends of the pipe were then closed by welding a carbon steel plate having a diameter of 210 mm and a thickness of 10 mm, and excess metal was removed by grinding. At the center of one of the carbon steel plates a hole having a diameter of 1 mm was drilled to avoid sealing the pipe.

The thus obtained material for hot-working, was heated to 1180° C., hot-extruded to reduce the diameter thereof to 100 mm, subjected to pickling to remove the oxidation scale from the surface thereof, and cut to a length of 110 mm.

Next, the thus produced round material having a diameter of 100 mm and a length of 110 mm was subjected to a controlled potential electrolysis at a constant potential of 500 mV vs S.C.E. with a graphite cathode having a surface area of 0.5 $m^2$ in a solution of ammonium nitrate ($NH_4NO_3$) and nitric acid, the concentrations being adjusted to $NH_4NO_3$ 300 g/ml and $HNO_3$ 100 g/ml respectively, and the temperature of the solution being maintained at 50° C. This dissolved and removed only the portion of mixed iron powder and $Al_2O_3$ powder.

This produced a honeycomb structure having a diameter of 100 mm, an outer sleeve wall thickness of about 1.7 mm, an inside honeycomb portion hole diameter of about 2 mm, and a honeycomb wall thickness of about 53 to 75 $\mu$m. The honeycomb was then well washed with water, dipped in a nitric acid solution having a 150 g/l concentration and maintained at 50° C for about 60 sec, washed with water, and dried.

Next, the thus produced honeycomb was subjected to the following test. A four-cylinder in-line gasoline engine having a piston displacement of 1600 cc was operated at an air-fuel ratio of 13.2, an engine speed of 1500 rpm, an engine torque of 5 kg m, while exhaust gas generated therein was introduced at a flow rate of 10 l/min and at a temperature of 140° C into an electric furnace maintained at 1150° C. The above produced honeycomb having a diameter of 100 mm and a length of 110 mm was heated in the electric furnace for 30 min, taken out of the furnace, air-cooled to a temperature of about 150° C, and put back into the furnace of 1150° C. This heat-and-cool cycle was repeated 400 times in total.

An appearance inspection of the thus subjected honeycomb evidenced no damage. Further, an inspection of the sections of the honeycomb showed that an about 3 $\mu$m thick dense $Al_2O_3$ coating was formed on the honeycomb wall and an about 5 $\mu$m thick dense protective oxide coating mainly composed of $Al_2O_3$ was also formed on the outer sleeve. This shows that the honeycomb produced by the method according to the present invention has sufficient endurance as a catalyst carrier for an automobile exhaust gas purifying device.

EXAMPLE 2

In the same process as in Example 1, after being densely filled with an easy soluble material of $CaCO_3$ powder, an electric weld pipe was cold-rolled to a wire having a diameter of 4 mm. The wire was streightened and then cut to a length of 570 mm to obtain wires having a core portion filled with the $CaCO_3$ powder.

Then, also in the same way as in Example 1, with the exception that the number of wires inserted was 2366, a filled cylindrical body having a diameter of 100 mm and a length of 110 mm was obtained.

The filled cylindrical body was subjected to a removal of the $CaCO_3$ portion by dissolution in flowing water at a temperature of 40° C under an applied vibration to obtain a honeycomb.

After being dried, the honeycomb was subjected to a pickling treatment in a solution having a composition of HF (15 g/l) and $HNO_3$ (150 g/l) for 30 sec at 50° C., washed with water, and dried.

This produced a honeycomb structure having a diameter of 100 mm, an outer sleeve thickness of about 1.7 mm, an inside honeycomb portion hole diameter of about 2 mm, and a honeycomb wall thickness of about 50 to 70 $\mu$m.

Next, the thus produced honeycomb was subjected to an endurance test in which the honeycomb was heated to and continuously held at 1100° C. in air for 500 hours.

An appearance inspection of the thus subjected honeycomb showed no damage thereto. A visual observation of the mid-length cross section of the honeycomb also showed no significant deformation. This proved that the honeycomb has a high durability.

EXAMPLE 3

Around a carbon steel wire having a diameter of 3 mm and a length of 570 mm, a 17% Cr stainless steel foil ribbon having a width of 25 mm and a thickness of 50 $\mu$m was wound in a spiral form and an aluminum foil ribbon having a width of 25 mm and a thickness of 15 $\mu$m was also wound in a spiral form further on the former ribbon, where the two winding operations were repeated twice in turn to obtain a composite wire. A 15Cr-4Al stainless steel pipe having a wall thickness of 3 mm, diameter of 210 mm, and length of 575 mm was filled with 4057 composite wires, closed with a plain carbon steel plate having a diameter of 210 mm and a thickness of 10 mm, and welded, where a final welding was performed after the pipe was evacuated to establish a vacuum inside the pipe. After grinding to remove excess metal at the outer circumferential portion of the weld, the welded pipe was heated at 600° C. for 1 hr and then 1200° C. for 1 hr and hot-extruded to a round bar having a diameter of 70 mm. Surface oxide scale on the bar was removed by a usual pickling, cut into bars having a length of 70 mm, and then the carbon steel portion was removed by dissolution in a 500 g/l concentration nitric acid at 50° C.

This produced a honeycomb structure having a diameter of 70 mm, an outer sleeve thickness of about 1 mm, and numerous inside holes about 1 mm in diameter. The honeycomb wall had a thickness of about 50 to 60 $\mu$m. A concentration distribution measurement of elements in the honeycomb section showed that the concentrations of Cr and Al ranged from 11 to 16% and from 5 to 8.5%, respectively.

The thus obtained honeycomb structure was subjected to an endurance test similar to that of Example 1. The results showed that a 400-repetition of the 1150° C.-30 min heat in an engine exhaust gas combined with the cooling to 150° C. caused no structural damage to the honeycomb, which exhibited a sound oxidation condition.

EXAMPLE 4

As a core material of easy-soluble material, a 140 mm square and 1 m long carbon steel billet having a composition of 0.005% C, 0.02% Si, 0.28% Mn, 0.022% P, and 0.014% S was used. The surface of the billet was covered with a 3.2 mm thick hot-rolled sheet of 15% Cr-4% Al ferritic stainless steel and the association portion was TIG-welded with the same type of stainless steel wire. Both ends of the billet were also closed by welding with the sheet.

Next, the billet was heated to 1220° C. and hot-rolled to obtain a 5.5 mm diameter wire. The wire was subjected to pickling and then straightening and cut to a length of 490 mm. Then, a welded pipe of SUS 304 (18 Cr-8 Ni stainless steel) having a wall thickness of 3 mm, a diameter of 210 mm, and a length of 500 mm was produced. The pipe was densely filled with 970 cut wires and both ends thereof were closed with SUS 304 steel plates and welded. A final welding was performed after evacuating the pipe to establish a vacuum inside the pipe.

Then, the pipe was heated to 1200° C. and hot-extruded to a 70 mm diameter round bar form. Further, the pipe was cut into 70 mm long pipes, the carbon steel portion of which was removed by dissolution in a 500 g/l concentration nitric acid solution maintained at about 50° C. under an application of an ultrasonic vibration.

This produced a honeycomb structure having a diameter of 70 mm and an outer sleeve thickness of about 1 mm, and provided with numerous holes about 2 mm in diameter therein. The holes were square shaped in the vicinity of the outer sleeve and roughly hexagonal in the remaining portion. The honeycomb wall had a thickness of about 30 to 55 $\mu$m.

Next, the heat resistance of the honeycomb in an exhaust gas when assembled as an exhaust gas purifying device was tested in the following way. The honeycomb was inserted between an exhaust manifold and an exhaust tube of a 1800 cc gasoline engine so that the engine exhaust gas flowed through the honeycomb. Then, the engine was operated for a total duration of 100 hours at a 4000 rpm-30 PS output. The ignition timing of the engine was adjusted so that the temperature at the honeycomb central portion was maintained at about 900° C.

An inspection after the test showed that the honeycomb had suffered no damage due to oxidation and fatigue.

A piece cut from the honeycomb was subjected to observation by a scanning electron microscope, which revealed that numerous flakes of $Al_2O_3$ were formed on and normal to the honeycomb surface.

This indicated that, when the $\gamma$-$Al_2O_3$ powder impregnated with a noble metal catalyst is adhered to the inner surfaces of honeycomb, i.e., a catalyst carrier, as usual, the flaky $Al_2O_3$ acts as an anchor for the $\gamma$-$Al_2O_3$, to strengthen the adherance.

As described above, the present invention provides a stainless steel honeycomb and an outer sleeve thereof in one body by a method simpler than the conventional methods, thereby enabling the production of a metallic substrate used for an automobile exhaust gas purifying device capable of reducing the resistance and volume of the gas flow and eliminating the bypass for exhaust gas, and will contribute greatly to the industry.

We claim:

1. A method for producing a metallic substrate used for an automobile exhaust gas purifying device, the metallic substrate having a length necessary for said use and substantially consisting of a honeycomb and an outer sleeve, both of which extend along the entire length of the the metallic substrate, wherein said method comprises the steps of:

preparing a heat-resisting steel member having a length and capable of containing therein easy-soluble material members and stainless steel members extending along the entire length thereof;

densely filling the heat-resisting steel member with said easy-soluble material members extending along the entire length of the heat-resisting steel member and with said stainless steel members for separating the easy-soluble material members from each other over the entire length thereof, to form a filled body;

hot-working the filled body to reduce the cross sectional area thereof at a reduction ratio necessary for achieving a metallic bond between the stainless steel members;

cutting the filled body to a predetermined length sufficient for the metallic substrate; and removing the easy-soluble material from the filled body by at least one of a chemical and an electrochemical treatment for boring throughholes extending along the entire length of the filled body to expose catalyst carrier-destined surfaces of the stainless steel.

2. A method according to claim 1, wherein said heat-resisting steel member is in the form of a pipe or a channel.

3. A method according to claim 2, wherein said stainless steel is in the form of a powder.

4. A method according to claim 1, wherein said easy-soluble material is in the form of a wire or a bar.

5. A method according to claim 1, wherein said easy-soluble material is in the form of a powder.

6. A method according to claim 1, wherein said stainless steel is in the form of a seamless pipe, a welded pipe, a pipe formed from strip, a wound foil, or a laminated structure of corrugated and flat sheets.

7. A method according to claim 1, wherein said stainless steel contains 11 to 30 wt% Cr and 0 to 6 wt% Al.

8. A method according to claim 1, wherein said hot-working is hot-extrusion, hot-forging, or hot-rolling.

9. A method according to claim 1, wherein each of said easy-soluble material members is covered by one or more of said stainless steel members beforehand, bundled, and then inserted densely into said heat-resisting steel member.

10. A method according to claim 9, wherein said honeycomb has a wall thickness of from 30 to 90 μm.

11. A method according to claim 1, wherein said easy-soluble material members have a diameter of from 1 to 8 mm.

* * * * *